United States Patent Office 3,419,477
Patented Dec. 31, 1968

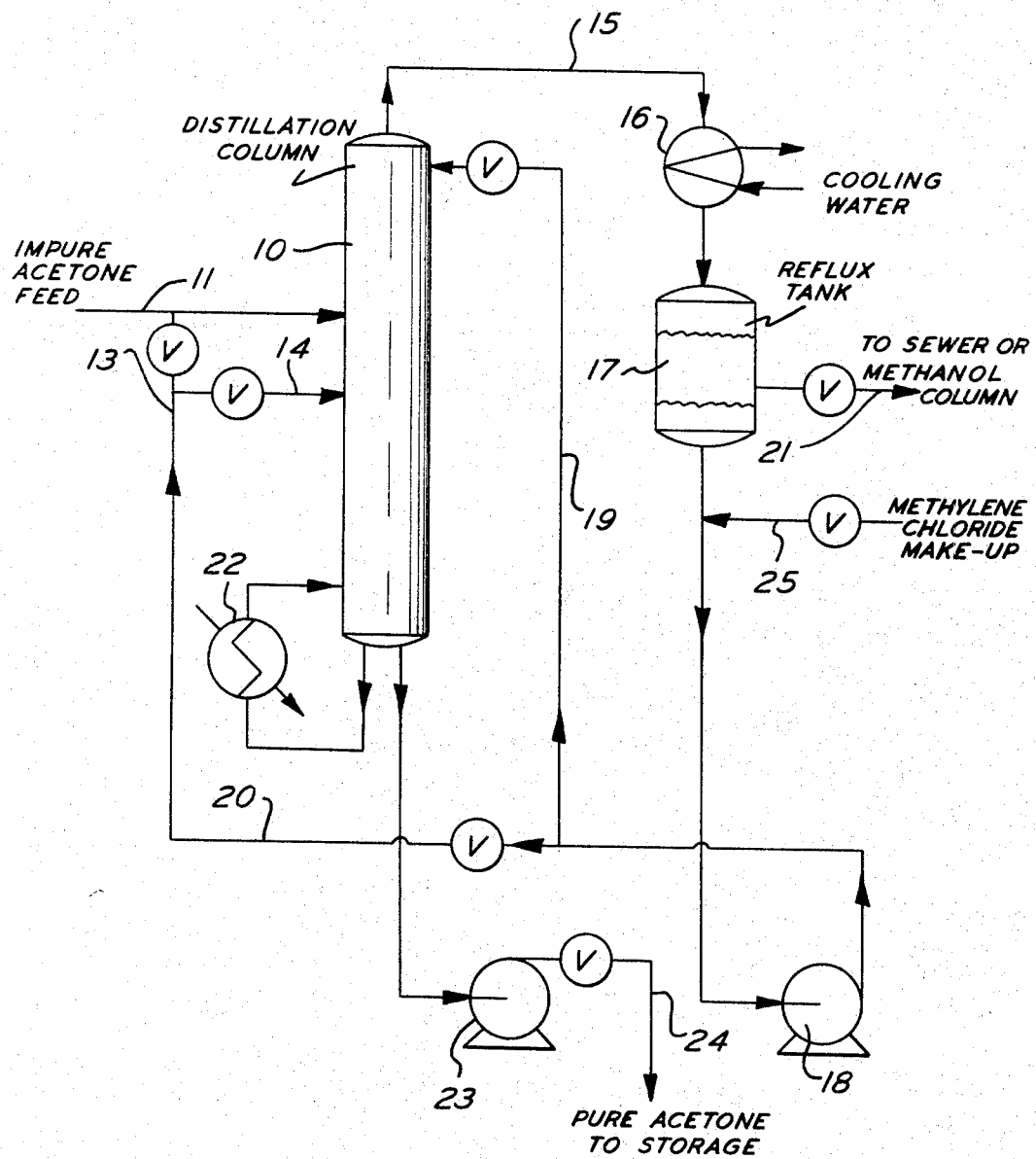

3,419,477
PROCESS FOR PURIFYING ACETONE BY
AZEOTROPIC DISTILLATION WITH AN
ALKYLCHLORIDE
Manlio M. Mattia, Ridley Park, Pa., assignor to Day &
Zimmermann, Inc., Philadelphia, Pa., a corporation of
Maryland
Filed Nov. 2, 1967, Ser. No. 680,156
4 Claims. (Cl. 203—67)

ABSTRACT OF THE DISCLOSURE

A method for purifying acetone containing less than ten weight percent of water and methanol which comprises azeotropically distilling such impure acetone with either methylene chloride or propyl chloride as an entraining agent.

---

The present invention is directed to a process for purifying acetone, and more particularly to a process for purifying acetone which has been contaminated with less than ten weight percent of water and less than ten weight percent of methanol.

The presence of water and methanol as contaminants, with each being present to the extent of less than ten weight percent, is common in a number of industrial uses for acetone. The removal of these contaminants has proved to be difficult and costly, and most existing commercial methods require repeated vaporization of the acetone in a high reflux distillation column.

Water has been used as an extracting agent in an attempt to remove methanol from acetone. However, it has proven difficult to purify acetone above about 99 percent without using an excessively large distillation column operated at high reflux rates.

The present invention has as an object the provision of a process for purifying acetone containing less than ten weight percent of water and methanol or a contaminant.

The present invention has as another object the provision of a method for purifying acetone in which the use of high reflux distillation columns is avoided.

A still further object of the present invention is the provision of a method by which very pure acetone can be obtained using simple equipment from acetone that has been contaminated with water and methanol.

Other objects will appear hereinafter.

In its broadest aspect, the subject invention may be used to purify acetone from either acetone that has been contaminated with less than about ten weight percent of water or acetone that has been contaminated with about ten weight percent of methanol. However, in its preferred embodiment the present invention is directed to a method for purifying acetone that has been contaminated with both less than about ten weight percent of water and less than about ten weight percent of methanol.

Referring to the drawing, which constitutes a diagrammatic flow sheet of the process of the present invention, methylene chloride will be used as the entraining agent for the purposes of illustration. The advantage of using methylene chloride as the entraining agent is due to the high relative volatility of the methylene chloride azeotropes with water and with methanol to the boiling point of acetone.

At atmospheric pressure the boiling point of the azeotropes of methylene chloride with water, and with methanol compare with the boiling points of the acetone-methanol azeotrope, acetone, methanol and water as follows:

| Composition: | Boiling point, ° F. |
|---|---|
| Methylene chloride (water azeotrope) | 100.5 |
| Methylene chloride (methanol azeotrope) | 102.5 |
| Methylene chloride | 104 |
| Acetone (methanol azeotrope) | 131 |
| Acetone | 133 |
| Methanol | 148 |
| Water | 212 |

The aforesaid boiling points are given at atmospheric pressure. However, the process of the present invention, while it can be performed at atmospheric pressure, is preferably performed at super-atmospheric pressures, namely pressures between about 30 to 100 pounds gauge. Above the pressure of about 100 pounds gauge the advantages obtained from the subject invention are offset by the cost of the heavier equipment needed to perform the process.

Referring to the drawing, the primary distillation column is designated 10. The acetone feed stream containing less than ten weight percent of methanol and less than ten weight percent of water enters the primary distillation column 10 through line 11. The entraining agent, which in the illustrated embodiment is methylene chloride, but which may, as above-indicated be either methylene chloride or propyl chloride, is introduced into the primary distillation column 10 through valved lines 13 and/or 14.

The methylene chloride forms azeotropes with the water and the methanol, each of which is more volatile than the acetone. These azeotropes distill from the top of the primary distillation column 10 through the line 15 to condenser 16.

In condenser 16 the overhead vapors from line 15 are condensed, and collected in the reflux tank 17.

The methylene chloride should be added in excess. It will leave the primary distillation column 10 overhead, along with the aforesaid azeotropic mixtures, since its boiling point is very close to that of the azeotropic mixtures.

By operating the distillation system at super-atomspheric pressure, cooling water derived from normal sources can be used to condense the vapors from primary distillation column 10 in condenser 16.

The condensed liquid collected in the reflux tank 17 forms two layers. The lower layer contains the methylene chloride, and the upper layer contains the methanol and the water. Small amounts of methylene chloride will be present in the upper layer, and some amounts of methanol and water will be present in the lower layer.

The reflux pump 18 returns the methylene chloride from the lower layer of reflux tank 17 through line 19 to the top of primary distillation column 10. The upper layer from the reflux tank 17 is removed through line 21. From line 21 it may be sent to a secondary distillation column for the recovery of methanol, or, if desired, may be sent to the sewer.

The reboiler 22 supplies the heat required for the primary distillation column 10. Pure acetone leaves the primary distillation column 10 from the bottom of the column through pump 23 and line 24 from which pure acetone may be passed to storage.

The methylene chloride make-up is added to the system through line 25.

In the illustrated embodiment, both water and methanol contaminants are present in the acetone.

If only a water contaminant is prevent in the acetone, then the process for purifying the acetone is identical with that set forth above, since two phases will be formed in the reflux tank 17, with the upper layer consisting of the water phase and the lower layer consisting of the methylene chloride.

However, if the acetone feed stream in line 11 is contaminated only with methanol, two phases will not form in the reflux tank 17 since methanol and methylene chloride are completely miscible. Where only methanol is present as a contaminant, the methanol concentration in the overhead would increase to a point where not further separation can be obtained. From that point forward, the acetone bottoms product would contain as much methanol as the acetone feed stream.

In order to remove the methanol, all that is equired is adding water to the reflux tank 17 to form the two phases. In the alternative, the methanol in line 19 can be removed from the reflux by extraction.

The process of the present invention enables acetone of high purity to be obtained from mixtures containing less than ten weight percent of methanol and/or less than ten weight percent of water.

The present invention may be embodied in other specific forms without departing from the spirit or essential attributes thereof and, accordingly, reference should be made to the appended claims, rather than to the foregoing specification as indicating the scope of the invention.

It is claimed:

1. A process for purifying impure acetone containing water and methanol contaminants, with the weight percent concentration of each of said water and methanol contaminants being less than ten weight percent, which comprises adding an entraining agent selected from the group consisting of methylene chloride and propyl chloride to the impure acetone, azeotropically distilling said mixture so that the water, methanol and entraining agent passes overhead, removing pure acetone as bottoms from the azeotropic distillation, condensing the overhead, separating entraining agent from water and methanol in the condensed overhead, and recycling separated entraining agent to the azeotropic distillation.

2. A process in accordance with claim 1 in which the azeotropic distillation is performed at a pressure of between about 30 to 100 pounds gauge.

3. A process in accordance with claim 1 in which the entraining agent is methylene chloride.

4. A process for purifying impure acetone containing methanol as a contaminant with the weight percent concentration of said contaminant being less than ten weight percent, which comprises adding an entraining agent selected from the group consisting of methylene chloride and propyl chloride to the impure acetone, azeotropically distilling said mixture so that the contaminant and entraining agent passes overhead, removing pure acetone as bottoms from the azeotropic distillation, condensing the overhead, separating entraining agent from contaminant in the condensed overhead, and recycling separated entraining agent to the azeotropic distillation.

References Cited

UNITED STATES PATENTS

| | | | |
|---|---|---|---|
| 2,259,951 | 10/1941 | Eversole et al. | 203—17 |
| 2,453,472 | 11/1948 | Teter et al. | 203—67 |
| 2,391,572 | 12/1949 | McFarlane | 203—67 |
| 2,856,331 | 10/1958 | Rosenthal et al. | 203—18 |

FOREIGN PATENTS

| | | |
|---|---|---|
| 560,169 | 3/1944 | Great Britain. |
| 20,935 | 2/1961 | Germany. |

WILBUR L. BASCOMB, JR., *Primary Examiner.*

U.S. Cl. X.R.

203—17, 91, 94; 260—593